United States Patent [19]

Robertson

[11] 4,057,130
[45] Nov. 8, 1977

[54] THROTTLE HOLDING DEVICE
[75] Inventor: Dean S. Robertson, Aurora, Ill.
[73] Assignee: Clark Equipment Company, Buchanan, Mich.
[21] Appl. No.: 616,737
[22] Filed: Sept. 25, 1975
[51] Int. Cl.² .................................... B60K 29/02
[52] U.S. Cl. .............................. 192/3 T; 74/513
[58] Field of Search ..................... 192/3 T; 74/513
[56] References Cited

U.S. PATENT DOCUMENTS

| | | | |
|---|---|---|---|
| 2,554,619 | 5/1951 | Goik | 192/3 T |
| 2,711,235 | 6/1955 | Pokorny | 192/3 T |
| 2,765,058 | 10/1956 | Struthers | 192/3 T |
| 2,891,417 | 6/1959 | Beegle | 192/3 T |
| 2,916,116 | 12/1959 | Eddy et al. | 192/3 T |
| 3,366,204 | 1/1968 | Couffer | 192/3 T |
| 3,439,783 | 4/1969 | Graham et al. | 192/3 T |

Primary Examiner—Benjamin W. Wyche
Attorney, Agent, or Firm—Harry G. Thibault

[57] ABSTRACT

A device is provided for maintaining the throttle of an internal combustion engine in a fixed position, the device including quick release means for the throttle. A friction device, such as a caliper brake, is provided for frictionally engaging the throttle rod to retain it in a predetermined position. The caliper brake is capable of gripping a section of the throttle rod and an electrical solenoid is capable when energized of urging the brake into engagement with the throttle rod to restrict its movement. A holding circuit incorporating the solenoid means for interrupting the circuit and thus disengaging the caliper brake to release the throttle, includes a hydraulic brake switch, a toggle switch and an ignition switch.

4 Claims, 2 Drawing Figures

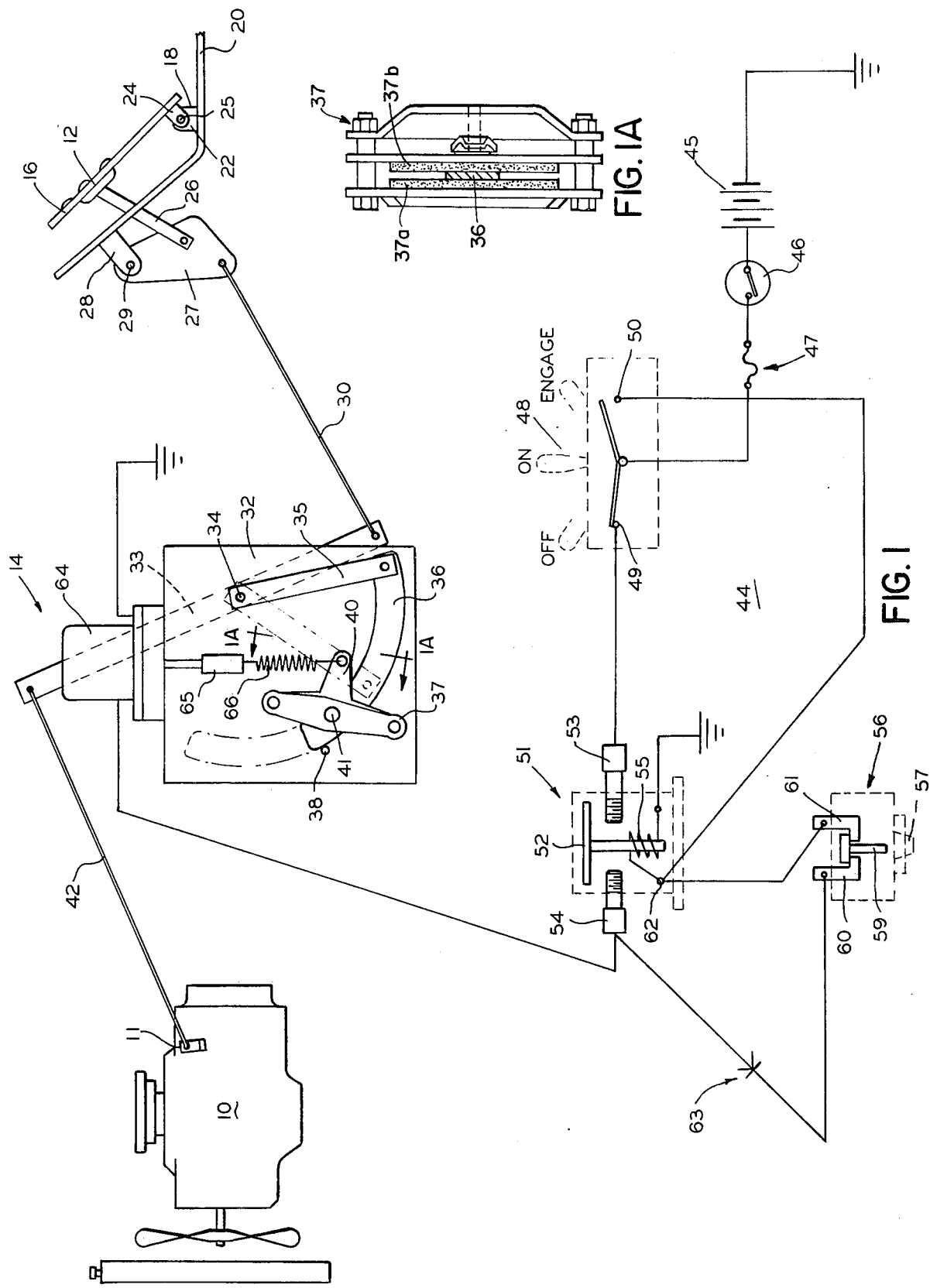

THROTTLE HOLDING DEVICE

BACKGROUND OF THE INVENTION

1. Field of the Invention

The present invention relates to speed control mechanisms for internal combustion engines and more particularly to a holding device for an engine speed control lever or throttle of an earth moving apparatus, such as a farming implement or a grader. Typically such vehicles have been provided with hand throttles which can be preset at a fixed position for operation of the vehicle. However, if an emergency situation developed, the vehicle operator had to manually close the throttle before applying the brake. Because such an arrangement prevented the vehicle operator from acting quickly enough when confronted with a panic stop it was proposed to replace the preset hand throttle with a resiliently biased foot pedal which was under the constant control of the operator. However, because of considerable forces exerted by the foot pedal and the need to keep such foot pedal depressed for long periods of time, it has become necessary to provide means associated with the foot pedal for retaining the throttle in a fixed position, as well as means for releasing the throttle when an emergency situation occurs.

2. Known Systems

Various means have been devised for controlling the speed of a vehicle. For example, U.S. Pat. No. 3,437,182 issued Apr. 8, 1969 to Mueller provides a governor for controlling the speed of a vehicle as well as means for adjusting the governor so as to increase or decrease speed as well as control deceleration of the vehicle. However, the apparatus disclosed by Mueller includes an elaborate vacuum assisted unit and generally represents a rather complex means for controlling the speed of a vehicle.

A second method is provided in U.S. Pat. No. 3,164,219 issued Jan. 5, 1965 to Orr. The Orr patent combines a hydraulic actuator with a series of complicated mechanical linkages and a frictional device for controlling the speed of a vehicle as well as controlling acceleration and deceleration of the vehicle.

The mechanisms disclosed by the foregoing patents are relatively complex, displaying multiple apparatus within a single system, such apparatuses including complicated mechanical linkages as well as relatively complex hydraulic or vacuum assisted devices requiring specialized manufacturing techniques and produced only at considerable expense. There exists a need for a relatively simple device for controlling the throttle of an internal combustion engine.

SUMMARY OF THE INVENTION

In the present invention, the engine speed control lever or throttle is held at a selected position by a caliper brake actuated by a holding circuit. The holding circuit includes a solenoid for actuating and releasing the caliper brake, the solenoid being connected to a source of DC power. The circuit controlling the solenoid may be broken by the deactivation of one or more circuit components serially connected with the solenoid including a toggle switch, a hydraulic brake switch, or the vehicle's ignition switch.

The engine has associated therewith a throttle lever or member adjustable for controlling the speed of the engine, the position of the throttle lever being controlled by a throttle pedal operatively connected thereto and mounted in the cab of the operating vehicle. An intermediate connecting mechanism between the engine throttle lever and the external throttle pedal, such as a bellcrank mechanism, is suitably mounted on the vehicle for pivotal movement between a throttle closed and a throttle open position. A throttle rod associated with the bellcrank mechanism is mounted to travel between the opposing faces of a caliper brake suitably mounted in association with the bellcrank mechanism for engagement with the throttle rod. The throttle rod travels an arcuate path between the opposing faces of the caliper brake corresponding to the movement of the throttle lever from a fully closed to a fully open position. Once the throttle lever has been set at the desired engine speed the caliper brake is actuated to frictionally engage the throttle rod and maintain it in a fixed position, with the throttle lever correspondingly positioned to produce a fixed engine output.

The caliper brake is actuated by a holding circuit comprising a solenoid serially connected to a source of DC power. An associated arm extending outwardly from the solenoid is connected to an actuating lever for the caliper brake. Circuit actuating components are serially connected between the solenoid and the source of DC power. An ignition switch interposed between the solenoid and the source of DC power must be activated to supply power to the holding circuit. A three-position toggle switch provided in the holding circuit must be actuated to activate a magnetic switch interposed between the solenoid and source of DC power. When the magnetic switch is energized the circuit is closed to carry DC power from the battery to the solenoid. A normally closed switch associated with a hydraulic brake is also provided in the circuit.

Current through the solenoid draws up its associated arm to pivot the lever energizing the caliper brake. Energization of the caliper brake locks the throttle rod in place to prevent movement of the throttle rod and the associated throttle lever.

The holding circuit may be inactivated as follows: (1.) Returning the ignition switch to the OFF position breaks the main electrical circuit to de-energize the magnetic switch and the solenoid. (2.) Switching the toggle mechanism to the OFF position also breaks the main electrical circuit. (3.) Applying the brake opens the hydraulic brake switch and breaks the electric circuit energizing the magnetic switch, causing the main electrical circuit from battery to solenoid to open, thus de-energizing the solenoid and releasing the caliper brake. (4.) Failure of the electrical system will also release the throttle.

Features and advantages of the present invention not set forth above will become apparent to persons skilled in the art from the following detailed description of a preferred embodiment of the invention accompanied by the attached drawing.

THE DRAWING

FIG. 1 represents a schematic view illustrating a throttle holding apparatus embodying the present invention; and FIG. 1A is a view of the caliper brake taken along the lines 1A of FIG. 1.

DETAILED DESCRIPTION OF THE PREFERRED EMBODIMENT

Typically, the throttle holding device of the present invention is associated with a mechanism for controlling the speed of an internal combustion engine for motor powered vehicles such as farm equipment or graders. Typically, the speed control apparatus for an engine 10 includes an engine speed control or throttle lever 11 movable in a throttle opening direction to increase the speed of the engine 10. Movement of the throttle lever or member 11 is controlled by a throttle pedal 12 which controls the rate of acceleration as well as the final speed of the engine 10. The throttle lever 11 and the throttle pedal 12 are operatively connected through a bellcrank mechanism 14 provided intermediate therebetween. The throttle pedal 112 is supported for movement about a neutral position and when moved in a first direction away from the neutral position, the throttle pedal 12 effects movement of the throttle lever 11 in a throttle opening direction to increase the speed of the engine 10. As the throttle pedal 12 moves in a return direction toward its neutral position, the throttle lever 11 moves in a throttle closing direction to decrease the speed of the engine 10.

The throttle pedal 12 comprises an elongated member having an upper foot engaging portion 16. The throttle pedal 12 is pivotally connected adjacent a lower longitudinal end to a bracket 18 bolted or otherwise suitably secured to a stationary support, such as the floor 20 of the cab of the associated vehicle. The bracket 18 is generally U-shaped and has a pair of spaced, upwardly extending portions or legs 22 and the throttle pedal 12 has a pair of laterally spaced, downwardly extending portions or legs 24 disposed outwardly of the legs 22 of the bracket 18. Aligned openings in the legs 22 and 24 receive a pivot pn 25 for retaining the throttle pedal 12 on the bracket 18. A spring (not shown) urges the pedal 12 to the neutral position when pressure on the pedal is released. A thrust member 26 is secured to and extends downwardly from the underside of the upper portion 16 of the pedal 12 and is suitably mounted thereon. A lower end of the thrust member 26 is pivotally mounted at one corner of a triangular crank or member 27 connected at an upper corner thereof to a bracket 28 secured to the underside of the floor 20. A pivotal connection 29 is provided between the member 27 and the bracket 28. A rod 30 having one end secured to a third corner of the member 27 connects the member 27 to the bellcrank mechanism 14.

The bellcrank mechanism 14 comprises a mounting box 32. A bellcrank lever 33 is secured at an intermediate portion thereof to the outside of the box 32. The lever 33 is mounted on a pivotal connection 34 extending through the box 32. Carried on the inside of the box 32 is a short arm lever 35 also mounted on the pivotal connection 34 and cooperatively engaged with the outer lever 33 so that a movement of the lever 33 results in a corresponding movement of the lever 35.

The opposite end of the rod 30 is connected to the lower end of the outer lever 33 of the mechanism 14. An arcuate throttle rod 36 is pinned to the lower end portion of the lever 35. A caliper brake 37 similar to the Model 11 ME-S caliper brake manufactured by H. H. Products Co., Inc. of Milwaukee, Wis. having opposing inner pads 37a, 37b (FIG. 1A) of friction material is appropriately secured to the mounting box 32 with the throttle rod 36 disposed between the opposing faces 37a, 37b of the caliper brake 37. A slide pin 38, secured to the mounting box 32, keeps the rod 36 between the pads of the caliper brake 37. The caliper brake 37 is also provided with an actuating lever 40 rotatable about a pivotal connection 41 provided on the brake 37 at respective mid portions of opposing faces 38.

Secured to the upper end of the bellcrank lever 33 is one end of a rod 42 having its opposite end secured to the throttle lever 11.

Associated with the caliper brake 37 of the present invention is a holding circuit 44 comprising a source of DC power 45, an ignition switch 46, a fuse or circuit breaker 47, and a three-position toggle switch 48 having contacts 49 and 50 associated therewith. Included in the holding circuit 44 is a magnetic switch 51 having a plunger 52, contacts or terminals 53 and 54 and a holding coil 55 associated therewith. A normally closed hydraulic brake switch 56 provided between the contact 53 and the holding coil 55 of the magnetic switch 51 has an actuator 57 lying adjacent a plunger 59, the plunger 59 normally engaging contacts 60 and 61 to close the switch 56. A diode 63 is provided between the switch 56 and the switch 51. A solenoid 64 suitably secured to the enclosure 32 has an operating arm 65 and an associated spring 66 and is operatively connected to the actuating lever 40 of the caliper brake 37.

OPERATION OF A PREFERRED EMBODIMENT

1. Mechanical Adjustment

The throttle member 11 may be adjusted to set the engine speed for the vehicle as follows. When the throttle pedal 12 is pushed downwardly, the thrust member 26 connected between the throttle pedal 12 and the member 27 urges the member 27 downwardly to pivot the member 27 about the pivotal connection 29 provided between the member 27 and the bracket 28. The pivoting of the member 27 pushes the rod 30 toward the bellcrank mechanism 14 to pivot the bellcrank lever 33 about the pivotal connection 34. The movement of the lever 33 draws the rod 42 connected to the upper end of the lever 33, toward the bellcrank mechanism 14, thus urging the engine throttle member 11 to the open position. As the bellcrank lever 33 is rotated by the connecting rod 30 to urge the throttle lever 11 to an open position, the lever 35 correspondingly rotates the throttle rod 36 through an arcuate path between the opposing faces of the caliper brake 37. The actuating lever 40 of the caliper brake 37 is then operated as described below to frictionally engage and hold the throttle rod 36 in place to fix the position of the throttle lever 11.

2. Operation of the Holding Circuit

The holding circuit 44 associated with the caliper brake 37 is operated as follows. With the throttle set in the desired position, the holding circuit 44 may be energized to actuate the caliper brake 37 to hold the throttle rod 36 in place. With the ignition switch 46 on, the toggle switch 48 may be moved from the OFF position wherein both contacts 49 and 50 are open, to the ENGAGE position wherein both contacts 49 and 50 are closed. With the toggle switch in the ENGAGE position, magnetic switch 51 is energized, with holding coil 55 drawing plunger 52 into engagement with contacts or terminals 53 and 54 to complete the circuit to the solenoid 64. When magnetic switch 51 is energized, current from terminal 54 of magnetic switch 51 is passed through the normally closed contacts 60 and 61 of the hydraulic brake switch 56 to terminal 62 of the magnetic switch 51 and through the holding coil 55 to keep the magnetic switch 51 energized. In the ENGAGE position the arm 65 of the solenoid 64 is drawn up to energize the caliper brake 37 and hold the throttle rod 36 in place.

When released, the toggle switch 48 automatically returns to an ON position in which contact 49 is closed and contact 50 is open, thus keeping the circuit from the battery 45 to the solenoid 64 closed. Because the solenoid 64 remains energized, the caliper brake 37 remains actuated and the throttle rod 36 is locked in place to prevent movement of the throttle lever 11.

The diode 63 is provided in the line from the terminal 54 to hydraulic switch 56 to protect the toggle switch 48 and the hydraulic switch 56 during the period of time that the toggle switch 48 is in the ENGAGE position. The diode 63 stops high pull-in current from the solenoid 64 from running through the holding circuit 44 from terminal 50 of the toggle switch 48 through the hydraulic switch 56 to terminal 54 of the magnetic switch 51.

3. Deactivating the Holding Circuit

Alternate independent means are provided in the holding circuit 44 to deactivate and de-energize the solenoid 64, thus releasing the associated caliper brake 37 to release the throttle rod 36 and close the throttle 11.

For example, the throttle lock may be removed by applying the brakes (not shown), thus pressing the actuator 57 to increase hydraulic pressure in the switch 56 and urge the plunger 59 outwardly to open normally closed contacts 60 and 61. This will deactivate holding coil 55 to open magnetic switch 51, thus opening the main electrical circuit from the battery 45 to the solenoid 64. De-energizing the solenoid 64 releases the solenoid arm 65 which in turn releases the actuating member 40 of the caliper brake 37 to release the caliper brake 37, free the throttle rod 36, and close the throttle 11.

Second, the throttle lock may be removed by moving the toggle switch 48 to the OFF position, opening contacts 49 and 50 and thus breaking the main electrical circuit at contact 49 to de-energize both the magnetic switch 51 and the solenoid 64 and release the caliper brake 37.

A third method of removing the toggle lock is simply to shut off the ignition switch 46. This opens the main circuit between the battery 45 and the solenoid 64, de-energizing the magnetic switch 51 and the solenoid 64 and releasing the caliper brake 37.

It should be noted that the system for holding the throttle lever does not automatically reset when the throttle holding device is de-energized. To reset the throttle it is necessary to reset the throttle to the desired position and, with the ignition switch 46 on, to energize the holding circuit 44 by flipping the toggle switch 48 to the ENGAGE position as described above. Note that the sequence for energizing the holding circuit 44 can be initiated with the toggle switch in either the ON or OFF position. It should also be noted that an electrical failure in the holding circuit 44 will also release the throttle. However, again, the system will not automatically reset.

Having thus described in detail a preferred embodiment of the invention, a person skilled in the art will be able to modify certain of the structure as illustrated and to substitute equivalent elements for those which have been disclosed, and it is, therefore, intended that all such modifications and substitutions be covered as they are embraced within the spirit and scope of the appended claims.

I claim:

1. A holding device for a throttle of an internal combustion engine including an internal combustion engine throttle lever, a throttle rod operatively connected to the throttle lever, the throttle rod being segmented into two portions having a bell crank mechanism disposed between respective ends of opposite portions of the throttle rod, the first segment of the throttle rod operatively connected between the throttle lever and one end portion of the bell crank mechanism, the second segment of the throttle rod operatively connected between the opposite end of the bell crank mechanism and one end of the second segment of the throttle rod, the opposite end of the second segment of the throttle rod being operatively connected to a throttle pedal operable to urge the throttle lever toward a throttle open position, the bell crank mechanism having a mounting member, a bellcrank lever pivotally mounted on the member, a coextensive member rigidly connected adjacent the bellcrank lever, the coextensive member engageable with a friction device capable of gripping said coextensive member to retain the bell crank mechanism and the throttle rod connected thereto in a preset position, and means for operating the friction device including an electrical solenoid capable when energized of urging the brake into engagement with the coextensive member to restrict its movement, and an operating circuit for engaging and disengaging the solenoid, said circuit comprising an energy source, a manually operated electrical switch for connecting said electrical energy means to the solenoid, a three-position switch disposed in the circuit engageable in a first position to activate the circuit, in a second position to maintain the circuit in an operating condition and in a third position to deactivate the circuit, a magnetic switch engageable upon engagement of the three-position switch to the first position, the engagement of the magnetic switch supplying electrical energy to the solenoid for operation thereof, and a hydraulically operated switch provided in the operating circuit capable of disconnecting the solenoid from said electrical energy source when the hydraulic pressure in the switch is above a predetermined minimum, whereby the throttle lever is movable between a throttle closed position and a throttle open position and the friction device may be engaged to hold the throttle rod in a predetermined position which maintains the throttle lever in an open position and may be disengaged to release the throttle rod and return the throttle lever to a closed position.

2. A holding device as claimed in claim 1 wherein the throttle rod is operatively connected to the bellcrank lever and the friction device is secured to the mounting member for cooperative engagement with the throttle rod whereby movement of the bellcrank lever produces corresponding movement of the throttle rod to move the throttle rod to a predetermined position with respect to the friction device.

3. A holding device as claimed in claim 1 including:
   a diode disposed between the magnetic switch and the hydraulically operated switch to direct current flow to the holding coil.

4. A holding device as claimed in claim 1 wherein the friction device comprises a caliper brake.

* * * * *